United States Patent [19]

Furukawa et al.

[11] Patent Number: 4,460,615

[45] Date of Patent: Jul. 17, 1984

[54] PROCESS FOR IMPROVING THE QUALITY OF WHEY PROTEIN

[75] Inventors: Tadayasu Furukawa; Tokuichi Taguchi; Kazuhiro Yamamoto; Shigenori Ohta, all of Tokyo, Japan

[73] Assignee: Kyowa Hakko Kogyo Kabushiki Kaisha, Tokyo, Japan

[21] Appl. No.: 430,208

[22] Filed: Sep. 30, 1982

[30] Foreign Application Priority Data

Oct. 2, 1981 [JP] Japan ............................... 56-157268
Feb. 5, 1982 [JP] Japan ................................. 57-17790

[51] Int. Cl.$^3$ ............................ A23J 1/20; A23J 3/02
[52] U.S. Cl. .................................... 426/657; 426/583; 426/614; 260/112 R
[58] Field of Search ............................ 426/583, 657; 260/112 R

[56] References Cited

U.S. PATENT DOCUMENTS

| | | | |
|---|---|---|---|
| 3,922,375 | 11/1975 | Dalan et al. ......................... | 426/583 |
| 3,930,039 | 12/1975 | Kuipers ........................... | 426/583 X |
| 4,089,987 | 5/1978 | Chang ............................. | 426/583 X |
| 4,267,100 | 5/1981 | Chang et al. .................... | 426/583 X |
| 4,361,588 | 11/1982 | Herz ................................ | 426/657 X |
| 4,362,761 | 12/1982 | Chang et al. .................... | 426/583 X |

FOREIGN PATENT DOCUMENTS

| | | | |
|---|---|---|---|
| 7214837 | 5/1974 | Netherlands ....................... | 426/657 |
| 2063273 | 6/1981 | United Kingdom ............... | 426/657 |

*Primary Examiner*—Robert A. Yoncoskie
*Attorney, Agent, or Firm*—Wolder, Gross & Yavner

[57] ABSTRACT

A process for improving the quality of whey protein, characterized by maintaining whey protein solution at a pH of from 8.5 to 11.5 and a temperature of from 35° to 50° C., adding to the solution a mixture of at least one acid selected from citric acid, phosphoric acid, polyphosphoric acids, phytic acid and oxalic acid with at least one acid selected from hydrochloric acid, sulfuric acid, lactic acid, tartaric acid, succinic acid and maleic acid so as to adjust the pH of the solution to 6–8. By the process of this invention, it is possible to obtain a whey protein having improved brittleness and excellent bending strength.

3 Claims, 1 Drawing Figure

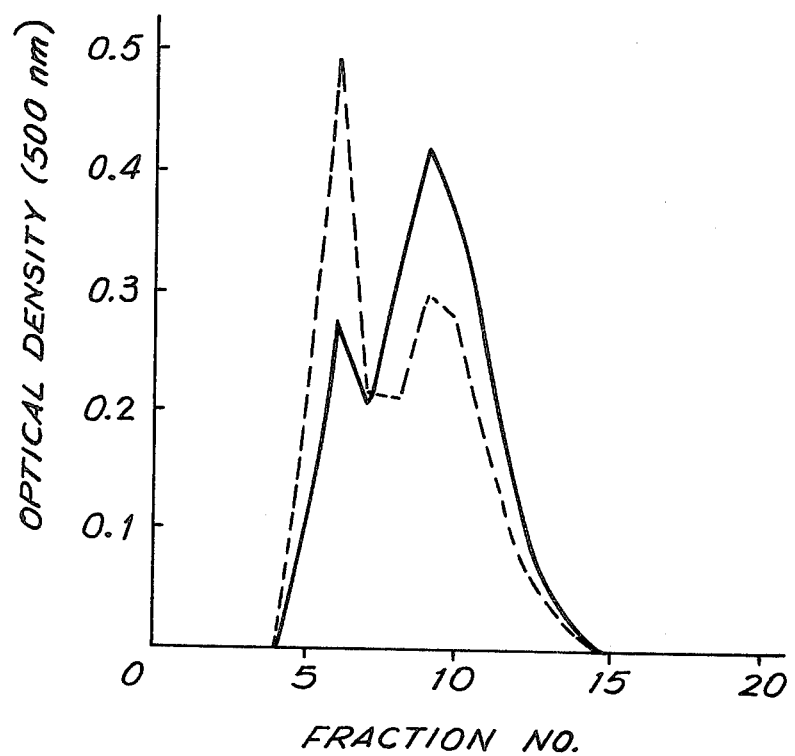

PROCESS FOR IMPROVING THE QUALITY OF WHEY PROTEIN

The present invention relates to a process for the preparation of improved whey protein capable of forming excellent gels such as, for example, gels having high strength and fine texture. More particularly, the present invention relates to a process for the preparation of improved whey protein having improved quality, which is characterized by maintaining a whey protein solution at a pH of from 8.5 to 11.5 and a temperature of from 35° to 50° C., adding to the whey protein solution a mixture of at least one acid selected from citric acid, phosphoric acid, polyphosphoric acids, phytic acid and oxalic acid with at least one acid selected from hydrochloric acid, sulfuric acid, lactic acid, tartaric acid, succinic acid and maleic acid so as to adjust the pH of the solution to 6–8.

It is known to recover proteins from milk whey such as, for example, cheese whey and casein whey on an industrial scale by various methods such as, for example, ultrafiltration and gel filtration so that various products containing whey protein at high concentration are obtained.

Although nowadays various whey protein preparates having high nutritional value may be available in common market for processing foodstuffs, such whey proteins have commonly the disadvantage that the gel-forming ability, that is, the ability of forming gels by heating is considerably lower than that of egg albumen and also the thus-obtained gels are very brittle. Thus it has been desired to provide whey protein having excellent gel-forming ability in order to increase the commercial and technical values of whey protein as raw material for processing foodstuffs.

It is known to lower the gelling temperature of whey protein derived from milk which comprises maintaining an aqueous solution of such whole whey protein having a concentration of proteins of from 0.5 to 10% weight/volume at an elevated temperature of at least 70° C. to effect an increase in the sulfhydryl group available for reaction, the period of time over which the proteins are maintained at the elevated temperature and the pH of the solution both being selected such that precipitation, gelling and coagulation of the proteins whilst at the elevated temperature is prevented, and cooling the resultant solution (Japanese Patent Application as laid open to public inspection as Kokai Koho Sho-56-26159=26159/81). It is also known to prepare a protein containing product, characterized by that a reduction in the temperature required for onset of thermogelation of a solution having a pH above the isoelectric point, and increased stability of the protein in a solution having a pH below the isoelectric point comprising cooling an ungelled alkaline heated solution containing from about 0.5 to about 20% by weight protein at a rate sufficient to prevent gelation of the solution, said protein being capable of thermogelling by formation of disulfide linkage under the influence of heat, which protein is substantially soluble in said alkaline solution, said heated alkaline solution having a pH within the range of from 7.5 to 10 and a temperature within the range of from 50° C. up to the gellation temperature of the solution, the protein derived from dairy, vegetable, meat and blood sources (Japanese Patent Application as laid open to public inspection as Kokai Koho Sho-56-99752=99752/81).

However, the gels prepared by using such known whey proteins have the disadvantages of brittleness and insufficient bending strength.

It has now been found that an improved whey protein which is capable of forming a strong gel having good texture may be obtained by the steps of adjusting the pH of a whey solution to 8.5–11.5 with an alkali and the temperature of the solution to at 35°–50° C., and adjusting the pH of the solution to 6–8 with addition of a mixture of at least one acid selected from citric acid, phosphoric acid, polyphosphoric acids, phytic acid and oxalic acid with at least one acid selected from hydrochloric acid, sulfuric acid, lactic acid, tartaric acid, succinic acid and maleic acid.

The present invention will fully and clearly be described in the following specification.

The whey proteins which may be used for the purpose of the present invention are exemplified by the whey protein concentrate obtained from milk whey such as cheese whey, casein whey and the like which may be prepared for example by ultrafiltration or gel filtration, although it is possible to use the whey protein solution prepared by rehydrating the whey protein powders obtained by spray-drying such concentrate. Such whey protein solution may preferably contain 3–15 %w/w whey protein. The ratio of the protein content to the total solids in the whey protein solution may not be excessively high and thus may preferably be more than 60%. A preferable whey protein solution used as a starting material is a concentrate obtained by adding specific acid salts to whey in a process for preparing a whey protein concentrate by ultrafiltration. The improved whey protein obtained by using the resulting concentrate as a starting material of the present invention have an excellent gel-forming ability. Now, a process for preparing a whey protein concentrate by ultrafiltration is set forth in detail below.

To a whey, at least one salt selected from the acid salts of citric acid, phosphoric acid, polyphosphoric acids, sulfuric acid and phytic acid is added in a preferable amount of from 0.05 to 3.5 %w/v. The mixture is stirred to dissolve the acid salt prior to ultrafiltration. The used acid salt may be added to the raw material in the form of a solid salt or salt solution.

Although it is possible to use various other organic acid salts having the chelating activity such as, for example, acid salts of oxalic acid, succinic acid, maleic acid, fumaric acid, ethylendiaminetetraacetic acid and the like, certain acid salts specified above are advantageous with respect to the used amount, effects and the ease of the preparation of foodstuffs.

With regard to ultrafiltration, it is advantageous to use an ultrafiltration membrane capable of fractionating substances having a largest possible molecular weight so far as it is possible to retain the protein content by ultrafiltration. Thus, it is preferred to use an ultrafiltration membrane capable of fractionating substances having a molecular weight of more than 5,000, preferably more than 10,000. If desired, it is also possible to add water to the solution to be filtered during the ultrafiltration.

The thus-obtained solution may be dried, for example, by spray-drying to give a whey protein concentrate containing 0.05–0.45 %w/w of calcium which is considerably smaller than the corresponding amount of calcium present in whey protein concentrates prepared by ultrafiltration alone in conventional manner.

When the thus-obtained whey protein concentrate is dissolved in water at a concentration of 8% and heated at a temperature of more than 70° C., it is possible to obtain a strong gel which is resistant to bending. The thus-obtained whey protein concentrate is useful as a foodstuff.

In order to control the pH and temperature of the whey protein solution, the solution is adjusted to a pH of 8.5–11.5 by using an alkali and is then heated to a temperature of 35°–50° C., although it is possible if desired to adjust the temperature, followed by adjusting the pH of the solution. It is also possible to adjust the pH and temperature simultaneously. The pH may be adjusted, for example, with sodium hydroxide.

After adjusting the pH and temperature, the solution is kept at this temperature for example for 2–240 minutes which may vary, with differing conditions such as, for example, the pH and temperature (preferably for 10–90 minutes).

Then, the solution is neutralized by adding to the solution a mixture of at least one acid selected from citric acid, phosphoric acid, polyphosphoric acids, phytic acid and oxalic acid (hereinafter referred to as group A) with at least one acid selected from hydrochloric acid, sulfuric acid, acetic acid, tartaric acid, succinic acid and maleic acid (hereinafter referred to as group B). Preferred examples of polyphosphoric acids are pyrophosphoric acid, tripolyphosphoric acid and hexametaphosphoric acid. The normality ratio (preferably 1:0.5–1:20) of A and B groups of acids may be convenient and may vary, with differing conditions such as, for example, the concentrations of the acids used. By addition of at least one acid of group A, it is possible to increase the bending strength of the gel formed, and by addition of at least one acid of group B, it is possible to increased the breaking strength of the gel.

After adjusting the pH of the solution to 6–8 by adding the mixture of acids, the whey protein solution may be used for processing foodstuffs, with or without dilution or concentration. It is also possible to dry the solution to obtain whey protein powders which may also be used for processing foodstuffs. The drying method is convenient, preferably the spray-drying.

The thus-obtained improved whey protein of the present invention may be dissolved in water, for example, at a concentration of more than 8 %w/w, followed by heating at a temperature of more than 70° C. to form a strong gel having excellent texture, and its strength is equal or superior to the strength of egg albumen. Its gelation temperature is lower than the corresponding temperature of conventional whey proteins. The improved whey protein exhibits a good solubility in water and salt solution (e.g. sodium chloride solution) like conventional whey proteins.

FIG. 1 shows a gel filtration pattern of an improved whey protein solution (indicated by - - -) and the corresponding pattern of a conventional whey protein solution, both obtained by using columns packed with Sephadex G-100.

This pattern is obtained by diluting an improved whey protein solution to give a protein concentration of 0.75% and subjecting this solution to a gel filtration by using a column (1.5×30 cm) packed with Sephadex G-100 (commercial product of Pharmacia Fine Chemicals AB., Sweden) under the following conditions:
  Eluting solution: Phosphate buffer solution (pH 7.0)
  Sample volume: 0.5 ml
  Volume of each fraction: 3 ml Determinating method: Lowry method (500 nm)

A reference pattern obtained by treating a whey protein (unimproved) under the same conditions is also indicated in FIG. 1. From this figure, it is apparent that the improved whey protein contains more fractions having higher molecular weights (Fraction Nos. 5–7) in contrast to the unimproved whey protein and thus the ratio of the associated products having such higher molecular weights is higher than that of the untreated whey protein. It has been found that the improved whey proteins obtained by the process of the present invention exhibit in general a ratio of forming the associated products of 35–75%, preferably 45–60%.

The following non-limiting examples illustrate the present invention.

EXAMPLE 1

In this Example, 1640 g of water is added to 360 g of a whey protein concentrate powder (total solids 96 %w/w, protein 75 %w/w, lactose 5.0 %w/w, total ashes 3.0 %w/w including calcium 0.5 %w/w) prepared in Reference 1 hereinafter described to prepare a solution containing 13.5 %w/w of protein. The ph of the solution is adjusted to 10.7 with 2N sodium hydroxide. Then, the solution is heated to 48° C. and maintained at this temperature for 15 minutes with gentle stirring. Then, the solution is divided into 10 equal parts, of which pH is adjusted to 6.8 by adding, in each occasion, one or more acids as indicated by 10 samples in the following Table 1. The yield of the associated product contained in the improved whey proteins is 57% which is higher than the corresponding yield (23%) obtained by using the untreated whey protein.

The sulfhydryl (SH) group in the improved whey proteins is determined by the method of Ellman [J. of Food Science, 39, 49 (1974)] to obtain a value of $13.5 \times 10^{-6}$ mole/g protein, while the corresponding value of the untreated whey protein is $18.7 \times 10^{-6}$ mole/g protein. From these values, it is found that the association reaction effected by the process of the present invention results in the decrease in the numbers of SH group.

Various solutions containing the improved whey proteins at a protein concentration of 9.4% are prepared. On each occasion, the solution is put in a casing having a diameter of 3 cm, heated at 90° C. for 30 minutes and cooled. The breaking strength of the thus obtained gel is measured in each occasion by using a Rheometer (commercial product of Fuji Rika K.K., Japan) to give the results as shown in Table 1.

TABLE 1

| No. | Acids used | A | B |
|---|---|---|---|
|   | 3N citric acid/1N hydrochloric acid |   |   |
| 1 | 1:0 (control) | 183 | A |
| 2 | 1:3 | 260 | A |
| 3 | 1:9 | 298 | A |
| 4 | 1:15 | 256 | A |
| 5 | 0:1 (control) | 179 | D |
| 6 | 1N phosphoric acid/1N hydrochloric acid (1:3) | 270 | A |
| 7 | 1N pyrophosphoric acid/1N hydrochloric acid (1:1) | 255 | A |
| 8 | 5% phytic acid/1N hydrochloric acid (1:6) | 275 | A |
| 9 | 2N oxalic acid/1N hydrochloric acid (1:4) | 245 | A |
| 10 | 3N citric acid/1N phosphoric acid/1N hydrochloric acid (1:1:12) | 265 | A |
| 11 | Control (gel of untreated whey protein) | 45 | D |

TABLE 1-continued

| No. | Acids used | A | B |
|---|---|---|---|
| 12 | Control (egg albumen gel) | 245 | B |

Nos. 2-10: Improved whey proteins except No. 5
No. 11: Conventional whey protein gel (control)
No. 12: Egg albumen (control)
A: Breaking strength (g) of gel
B: Texture of gel (bending strength test)

In Table 1, the bending strength is determined in reliance with the method by Okada, Yokozeki and Maki [Fish meal paste products, page 374 (1974) published by Kosei-sha Kosei-kaku, Japan] and the gel texture (bending strength) is expressed by the following classes A–D determined by folding a piece of gel plate having a diameter of 3 cm and a thickness of 2 mm into 2 or 4 as follows:

A (very good): No crack is formed by folding the piece into 4.
B (good): By folding into 2, no crack is formed
C (brittle): By folding into 2, crack is formed to about one half of the diameter.
D (very brittle): By folding into 2, crack is formed across the diameter.

Table 1 indicates the followings:
Stronger gels are obtained by using mixed acids when compared with the use of a sole acid.
The improved whey protein gels have a better texture than the gels obtained from untreated whey protein, and their gel strength is equal or superior to the strength of egg albumen.
By heating at 70° C., the improved whey proteins are sufficiently gelified, in contrast to a temperature of higher than 80° C. needed for the gel formation of untreated whey protein.

EXAMPLE 2

In this Example, a whey protein solution prepared in Reference 2 hereinafter described is used. The solution is divided into fractions which are respectively treated to improve the property under the conditions as shown in Table 2 and which are then adjusted to a pH of 7.2 with addition of a mixture of acids which have been prepared by adding citric acid to hydrochloric acid to give a final concentration of the mixture of 1.5N calculated as citric acid or 4.5N calculated as hydrochloric acid. The yield of the associated product obtained from each of the improved whey protein is shown in Table 2. Then, the solution of the improved whey protein is spray-dried on each occasion to obtain a powder. The powder is dissolved in water to give a solution having a protein concentration of 9.4 %w/w, from which a gel is prepared in a similar manner to that described in Example 1 and its breaking strength and texture are determined in a similar manner to that described in Example 1, as shown in Table 2. All of the thus-prepared powders are completely dissolved when dispersed in water or 3 %w/w sodium chloride solution at a concentration of 2 %w/w.

TABLE 2

| No. | A [pH* | Temp (°C.) | Time (min.)] | B | C | D** |
|---|---|---|---|---|---|---|
| 1 | 10.7 | 38 | 60 | 60 | 260 | A |
| 2 | 10.1 | 47 | 30 | 58 | 265 | A |
| 3 | 9.5 | 47 | 60 | 49 | 210 | A |
| 4 | 10.7 | 30 | 120 | 33 | 145 | C |
| 5 | 8.0 | 47 | 120 | 30 | 120 | C |
| 6 | 10.0 | 55 | 30 | 63 | 110 | C |

TABLE 2-continued

| No. | A [pH* | Temp (°C.) | Time (min.)] | B | C | D** |
|---|---|---|---|---|---|---|
| 7(E) | | | | 14 | 70 | D |

*Adjusted by using 10N sodium hydroxide solution.
A - Conditions for improving treatments
B - Yield (%) of the associated product
C - Breaking strength (g) of gel
D - Texture (by bending test as shown in Table 1)**
E - Conventional whey protein (control)

From Table 2, it is apparent that the whey proteins (Nos. 1, 2 and 3) treated under the improved conditions taught by the present invention i.e. at a pH of 8.5–11.5 and at a temperature of from 35°–50° C. are far superior to the whey proteins treated under the conditions which do not fall in the scope of the present invention [No. 4—the temperature; No. 5—the pH; and No. 6—the temperature] with respect to the mechanical strength and texture of the gel.

EXAMPLE 3

In this Example, a whey protein concentrate powder prepared in Reference 1 hereinafter described is used. The powder is dissolved in water to give a protein concentration of 9.4 %w/w. The pH of the solution is adjusted to 10.2 with 10% sodium hydroxide solution and then the solution is heated at 45° C. for 30 minutes, followed by dividing into 7 equal fractions. On each occasion, the fraction is adjusted to a pH of 7.0 by adding each of the acids shown in Table 3 and spray dried to obtain a powder. The powder is dissolved in water to give a concentration of protein of 9.4 %w/w, from which a gel is prepared in a similar manner to that described in Example 1, of which physical properties are indicated in the following Table 3.

TABLE 3

| No. | A | B | C |
|---|---|---|---|
| 1 | Citric acid/hydrochloric acid (1.5N:4.5N) | 245 | A |
| 2 | 1N citric acid | 180 | A |
| 3 | 1N hydrochloric acid | 175 | D |
| 4 | 1N acetic acid | 135 | C |
| 5 | 1N lactic acid | 163 | B |
| 6 | 1N tartaric acid | 144 | B |
| 7 | 1N succinic acid | 170 | B |

*Determined in a similar manner to that described in Example 1
A - Used acids
B - Breaking strength (g) of gel*
C - Texture (by bending test)*

Table 3 indicates that by using a mixture of acids, the mechanical properties (gel strength and texture) are greatly improved when compared with the use of a sole acid.

EXAMPLE 4

In this Example, a whey protein concentrate powder (No. 1 in Table 4) prepared in Reference 3 hereinafter described is used. The powder is dissolved in water to give a protein concentration of 11.5 %w/w.

To this solution is added 2N sodium hydroxide to adjust the pH to 10.0. The solution is heated to 45° C. and kept at this temperature for 30 minutes with agitation. Then, to the solution is added a mixture of 3N citric acid and 1N hydrochloric acid (1:9 by volume) to adjust the pH to 6.8. The solution is spray-dried to obtain powders, from which a gel is prepared in a similar manner to that described in Example 1. The breaking strength of this gel is 368 g, while the breaking strength of a control gel prepared by treating the control sample (No. 7 in Table 4) described Reference 3 in a similar manner to that described above is 240 g.

REFERENCE 1

In this Reference, a cheese whey (total solids 5.9 %w/v, protein 0.73 %w/v, lactose 4.3 %w/v, total ashes 0.50 %w/v including calcium 0.06 %w/v, pH 6.4) is subjected to ultrafiltration using a membrane for fractionating substances having a molecular weight of 20,000 in a conventional manner, whereby the cheese whey is concentrated to one-twentieth of its original volume. The residual solution is diluted three times (v/v) with purified water and the diluted solution is concentrated to one-third of its original volume by ultrafiltration. The concentrate is spray-dried to obtain a whey protein concentrate (total solids 96 %w/w, protein 75 %w/w, lactose 5.0 %w/w, total ashes 3.0 %w/w including calcium 0.5 %w.w).

REFERENCE 2

In this Reference, a cheese whey (total solids 5.9 %w/v, protein 0.73 %w/v, total ashes 0.50 %w/v including calcium 0.06 %w/v, pH 6.4) is subjected to ultrafiltration using a membrane for fractionating substances having a molecular weight of 10,000 in a conventional manner, whereby the cheese whey is concentrated to one-tenth of its original volume. The residual solution is diluted two times (v/v) with purified water and the diluted solution is concentrated to a half of its original volume by ultrafiltration to obtain a whey protein solution (total solids 10.5 %w/w, protein 7.5 %w/w, total ashes 0.4 %w/w including calcium 0.06 %w/w).

REFERENCE 3

In this Reference, a cheese whey (total solids 5.9 %w/v, protein 0.75 %w/v, lactose 4.3 %w/v, total ashes 0.50 %w/v including clacium 0.07 %w/v) is divided into pieces (each 1000 liter). On each occasion, either (1) sodium citrate, (2) disodium hydrogen phosphate, (3) sodium metaphosphate, (4) sodium phytate, (5) sodium sulfate or (6) a mixture of sodium citrate and sodium metaphosphate (1:1 by weight) (each 3 kg) is added to the whey sample and dissolved by well mixing. The solution is subjected to ultrafiltration using a membrane for fractionating substances having a molecular weight of 20,000 in a conventional manner, whereby the cheese whey is concentrated to one-twentieth of its original volume. The residual solution is diluted three times (v/v) with purified water, followed by a further ultrafiltration to give a 50 l of a whey protein concentrate. After adjusting the pH of 7.0 with sodium hydroxide, the solution is spray-dried to obtain a whey protein concentrate powder. The calcium and protein contents present in respective a whey protein concentrate powder are indicated in Table 4, from which it is apparent that the calcium contents in the samples decrease significantly.

Subsequently, each a whey protein concentrate sample is added with water to obtain a solution containing 9.4 %w/w of protein. The solution is put into a casing having a diameter of 3 cm, heated at 90° C. for 30 minutes and cooled to 25° C. The breaking strength of the thus-prepared gel is measured by using a Rheometer (commercial product of Fuji Rika K.K., Japan) and indicated in Table 4.

TABLE 4

| No. | Acid salt used | Whey protein concentrate Protein | Whey protein concentrate Calcium | Gel Breaking strength |
|---|---|---|---|---|
| 1 | Sodium citrate | 78% | 0.25% | 150 g |
| 2 | Disodium hydrogen phosphate | 78 | 0.40 | 60 |
| 3 | Sodium hexametaphosphate | 78 | 0.30 | 115 |
| 4 | Sodium phytate | 78 | 0.25 | 105 |
| 5 | Sodium sulfate | 78 | 0.38 | 65 |
| 6 | Sodium citrate/sodium hexametaphosphate (1:1) | 78 | 0.30 | 130 |
| 7 | Control (no additive) | 78 | 0.53 | 30 |

REFERENCE 4

In this Reference, a cheese whey (total solids 5.9 %w/v, protein 0.75 %w/v, lactose 4.3% w/v, total ashes 0.50 %w/v including calcium 0.07 %w/v) is subjected to ultrafiltration to be concentrated to one-tenth of its original volume by using a membrane capable of fractionating substances having a molecular weight of more than 20,000. Thus thus-obtained whey concentrated solution is divided into fractions (each 100 liter). One each occasion, the sample solution is added with either (1) sodium citrate, (2) disodium hydrogen phosphate, (3) sodium tripolyphosphate, (4) sodium phytate, (5) sodium sulfate or (6) a mixture of sodium citrate and sodium tripolyphosphate (2:1 by weight) (each 0.5 kg). The mixture is further added with purified water (300 liter) and well stirred to form a solution which is then subjected to ultrafiltration to obtain a whey protein concentrate solution (50 liter). After adjusting the pH to 6.7, the whey protein concentrate solution is spray-dried to obtain a whey protein concentrate powder having the protein and calcium contents as indicated in Table 5.

TABLE 5

| No. | Acid salt used | Whey protein concentrate Protein | Whey protein concentrate Calcium | Gel Breaking strength |
|---|---|---|---|---|
| 1 | Sodium citrate | 83% | 0.21% | 145 g |
| 2 | Disodium hydrogen phosphate | 83 | 0.45 | 55 |
| 3 | Sodium tripolyphosphate | 83 | 0.35 | 120 |
| 4 | Sodium phytate | 83 | 0.30 | 100 |
| 5 | Sodium sulfate | 83 | 0.45 | 60 |
| 6 | Sodium citrate/sodium tripolyphosphate (2:1) | 83 | 0.25 | 140 |
| 7 | Control (no additive) | 83 | 0.51 | 45 |

REFERENCE 5

In this Reference, a whey protein concentrate (total solids 7.0 %w/v, protein 4.9 %w/v, total ashes 0.32 %w/v and having a ratio of calcium/protein of $5.3 \times 10^{-3}$) is tested. On each occasion, to the sample (1000 liter) is added sodium citrate in an amount of (1) 0 kg, (2) 0.7 kg, (3) 1.4 kg, (4) 2.1 kg, (5) 3.5 kg or (7) 7.0 kg. The mixture is stirred to form a solution which is subjected to ultrafiltration using a membrane for fractionating substances having a molecular weight of 10,000 to give a whey protein concentrate solution (500 liter) having a protein content of 9.8 %w/w. Table 6 indicates that the ratio of calcium to protein decreases in accordance with the increase in the amount of sodium citrate used. After adjusting the pH of the whey protein concentrate solution to 6.8, in a similar manner to that described in Reference 3, each solution is put into a casing to prepare a gel having a breaking strength as indicated in Table 6, from which it is apparent that the ratio of calcium to protein within a range of from $4.3 \times 10^{-3}$ to $1.5 \times 10^{-3}$ gives the gels which are significantly stronger than the control gel (without addition of sodium citrate).

TABLE 6

| No. | Amount of sodium citrate added | Ratio of calcium to protein | Breaking strength of gel |
|---|---|---|---|
| 1 | 0 kg | $5.3 \times 10^{-3}$ | 35 g |
| 2 | 0.7 | $4.3 \times 10^{-3}$ | 75 |
| 3 | 1.4 | $3.3 \times 10^{-3}$ | 160 |
| 4 | 2.1 | $2.9 \times 10^{-3}$ | 145 |
| 5 | 3.5 | $1.5 \times 10^{-3}$ | 85 |
| 6 | 7.0 | $0.5 \times 10^{-3}$ | 45 |

We claim:

1. A process for improving the quality of whey protein, which comprises maintaining a whey protein solution containing 3–15% by weight of protein at a Ph of from 8.5 to 11.5 and a temperature of from 35° to 50° C. for 2–240 minutes, adding to the solution a mixture of at least one acid selected from the group consisting of citric acid, phosphoric acid, polyphosphoric acids, phytic acid and oxalic acid with at least one acid selected from the group consisting of hydrochloric acid, sulfuric acid, lactic acid, tartaric acid, succinic acid and maleic acid at a normality ratio of 1:05 to 1:20 so as to adjust the pH of the solution to 6–8.

2. The process of claim 1 in which the initial whey protein solution is a concentrate obtained by adding to the whey at least one salt selected from the acid salts of citric acid, phosphoric acid, polyphosphoric acids, phytic acid and sulfuric acid in an amount of 0.05 to 3.5 w/v%, and ultrafiltrating the resultant mixture.

3. The process of claim 1 wherein a mixture of citric acid and hydrochloric acid is employed.

* * * * *